United States Patent [19]

Belart et al.

[11] 4,415,210

[45] Nov. 15, 1983

[54] ARRANGEMENT FOR CONTROLLING THE PRESSURE IN BRAKE ACTUATING CYLINDERS OF A VEHICLE

[75] Inventors: Juan Belart, Walldorf; Jochen Burgdorf, Offenbach-Rumpenheim; Dieter Kircher, Frankfurt am Main; Lutz Weise, Mainz; Hans-Wilhelm Bleckmann, Obermoerlen, all of Fed. Rep. of Germany

[73] Assignee: ITT Industries, Inc., New York, N.Y.

[21] Appl. No.: 315,819

[22] Filed: Oct. 28, 1981

[30] Foreign Application Priority Data

Oct. 28, 1980 [DE] Fed. Rep. of Germany ....... 3040561

[51] Int. Cl.$^3$ .............................................. B60T 8/02
[52] U.S. Cl. ................................... 303/116; 303/6 C; 303/92
[58] Field of Search .......................... 60/548; 188/345; 303/10, 52, 85, 92, 113–116, 119, 6 C

[56] References Cited

U.S. PATENT DOCUMENTS 4,340,257  7/1982  Belart ................................. 303/114
4,354,714 10/1982  Belart ................................. 303/114

Primary Examiner—Duane A. Reger
Attorney, Agent, or Firm—James B. Raden; Marvin M. Chaban

[57] ABSTRACT

An arrangement for controlling the pressure in brake actuating cylinders incorporated in a hydraulic vehicle braking system which is supplied with auxiliary energy includes a master cylinder device having at least one master piston accommodated in a bore communicating with a replenishment chamber. A brake pedal actuated control valve device is arranged between the master cylinder device and the brake pedal and controls the supply of auxiliary energy from an auxiliary energy supply source through a hydraulic conduit to the replenishment chamber. Electromagnetically actuatable control valves are included in the braking circuit and locking of the wheels by controlling the operation of the wheel brake actuating cylinders. Furthermore, there is provided a return conduit to a hydraulic reservoir which incorporates a normally open hydraulic shutoff valve which closes when the pressure of the auxiliary energy drops below a predetermined threshold value. An electromagnetically actuatable normally closed valve is interposed in the hydraulic conduit, being opened when there is a need for antiskid control action. Another valve connects the replenishment chamber with the reservoir when the brake pedal is in its rest position, while discontinuing such communication during the antiskid control action. Thus, pressure in the replenishment chamber is relieved during normal braking operation and rises up to that of the auxiliary pressure source during antiskid control operation. All of the valves which are hydraulically actuatable in dependence on the pressure of the auxiliary energy can be structurally incorporated in a valve unit.

25 Claims, 8 Drawing Figures

ARRANGEMENT FOR CONTROLLING THE PRESSURE IN BRAKE ACTUATING CYLINDERS OF A VEHICLE

BACKGROUND OF THE INVENTION

The present invention relates to an arrangement for controlling the pressure in brake actuating cylinders of a vehicle, and more particularly to an arrangement of this type which is usable in a hydraulic braking system of a motor vehicle provided with an antiskid control equipment, and with an auxiliary source of pressurized hydraulic fluid.

There are already known pressure controlling arrangements of this type which include a master cylinder device comprising a housing defining a bore, at least one master piston in the bore, and at least one feeding port in the housing. A conventional arrangement of this type further includes a pedal-actuatable brake-valve device located in front of the master cylinder device and operative for the introduction of auxiliary energy from an auxiliary energy supply system including a hydraulic reservoir, a pump, a pressure accumulator, as well as associated connecting conduits, electromagnetically actuatable control valves in the brake conduit connected to the master cylinder device for the purpose of brake anti-skid control of the wheel brake actuating cylinders having a return conduit to the hydraulic reservoir, wherein a hydraulic closing device is inserted in the return conduit and is normally open and closes upon failure of the auxiliary energy, and a hydraulic conduit between the outlet of the brake-valve device and at least one replenishment chamber associated with the master cylinder device and communicating with the associated feeding port.

A brake system equipped with anti-skid control device and constructed in this manner is known from German published patent application DE-OS No. 24 43 545. In this construction, the outlet of the brake-valve device directly communicates with the two replenishment chambers of the master-cylinder device which is designed as a tandem master cylinder, and, when the brake pedal is depressed, auxiliary energy is directly supplied to the secondary side and from there to the operating side of the sleeve-sealed master cylinder pistons in order to dynamically actuate the wheel brake cylinders of both brake circuits. The tandem master cylinder is designed as a stepped piston having at its end close to the brake pedal an enlarged flange portion of a greater diameter than the piston itself, so that a pressure chamber is formed during operation on the secondary side of the first piston which is close to the pedal, this pressure chamber being adapted to be fed with auxiliary energy, and being in communication with the associated replenishment chamber of the respective piston. In the presence of auxiliary energy, the pressure in the pressure chamber urges the piston against an axial stop rigid with the housing in opposition to the pedal-force direction, so that, during normal braking operation, the piston is kept stationary in the presence of auxiliary energy. Upon failure of the auxiliary energy, the stepped piston coupled to the pedal-actuatable brake-valve device will be mechanically actuated which results in a static actuation of the wheel brake cylinders. In this arrangement, the hydraulic closing device in the return line, which is normally open, will be closed so that no pressure fluid is able to escape from the brake circuits. Thus, the known brake antiskid control apparatus is usually operated by auxiliary energy, and only in case of emergency, when the auxiliary energy fails, will the stepped piston operate in the manner which is conventional in the static actuation of the brake circuits. Due to the continuous introduction of auxiliary energy during operation, a large quantity of auxiliary energy has to be kept constantly available; the auxiliary energy system is required to be dimensioned in a correspondingly voluminous manner. In addition to the consumption of a large quantity of auxiliary energy resulting in a considerable power loss of the device, it is furthermore a disadvantage of this conventional arrangement that fail-free braking operation is not ensured in all instances upon failure of the auxiliary energy supply system, that is, the arrangement may become inoperative due to possible leaks in the sleeve seal of the individual master-cylinder pistons which cannot be perceived during normal operation of the brake with the auxiliary source in operation.

SUMMARY OF THE INVENTION

Accordingly, it is a general object of the present invention to avoid the disadvantages of the prior art.

More particularly, it is an object of the invention to provide an arrangement for controlling the pressure in the actuating cylinders of wheel brakes incorporated in the hydraulic braking system of a motor vehicle, which is not possessed of the disadvantages of the conventional arrangements of this type.

Still another object of the invention is to so construct the arrangement of the type here under consideration as to consume only a minimum amount of auxiliary energy during its normal operation, that is, in the absence of antiskid control action, and yet to make the requisite amount of auxiliary energy available during the antiskid control action.

It is yet another object of the present invention to devise a control arrangement of this type which will render it possible to detect leaks in the master cylinder device even when the auxiliary source of pressurized fluid is fully operational.

It is an additional object of the invention to so design the control arrangement as to be relatively simple in construction, inexpensive to manufacture, and reliable in operation nevertheless.

In pursuance of these objects and others which will become more apparent hereafter, one feature of the present invention resides in an arrangement for controlling the pressure of a hydraulic braking fluid in brake actuating cylinders incorporated in a hydraulic braking sytem, especially that of a motor vehicle, having antiskid control equipment and a supply reservoir, in dependence on the position of a brake operating member movable from a rest position into a plurality of operating postions, this arrangement comprising a master cylinder device including a housing component defining at least one bore and having at least one feeding port communicating with the bore, and at least one master piston received in the bore for movement axially thereof; means for replenishing the supply of hydraulic fluid in the bore, including an auxiliary source of pressurized hydraulic fluid, means defining at least one replenishment space communicating with the feeding port, and first and second connecting means for respectively connecting the replenishment space with the auxiliary source and with the reservoir; means for establishing communication between the replenishment space and the first connecting means only during the control action of the antiskid control equipment; and means for interrupting communication between the replenishment space and the second connecting means at least during the control action. A particularly advantageous construction is obtained when the interrupting means is operative for establishing communication between the replenishment space and the second connecting means at least while the brake operating member is in its rest position. Advantageously, a cutoff valve is interposed in the first connecting means between the establishing means and the auxiliary source, such cutoff valve being switchable in dependence on the pressure of the hydraulic fluid from the auxiliary source between an open position assumed when the auxiliary source is operational and a closing position assumed when the auxiliary source fails. This construction ensures a normal master cylinder function during normal braking operations, this function involving static actuation of the assigned brake circuits. When an antiskid control action is performed, the hydraulic conduit between the outlet of the brake-valve device and the replenishing chamber of the master cylinder will be opened while the compensating conduit to the low-pressure hydraulic reservoir will be closed, so that the auxiliary energy propagates from the replenishment chamber via the secondary side of the piston to the operating side of the piston and from there into the assigned brake circuits thus causing dynamic actuation of the wheel brake actuating cylinders. Thus, a static brake system is transformed during the antiskid action into an auxiliary energy brake system by the introduction of the controlled pressure of the brake valve device into the static brake circuit(s). Consequently, according to the present invention, the auxiliary energy which is available in any event and is normally utilized for boosting the brake force is employed for the antiskid control action as well. Since the dynamic operation of the wheel brake actuating cylinders takes place only in usually rare instances when antiskid control action is needed, the apparatus can be operated in a very energy-saving manner with low power loss; the auxiliary energy supply system can thus be dimensioned accordingly small. Since only the conventional master cylinder function with static actuation of the wheel brake cylinders is performed during normal braking operation, possible leaks in the seal of the master piston will be noticed as soon as they develop. Thus, there is obtained a permanent monitoring of the integrity of the master piston seal, so that arrangements for repairs which may become necessary can be made immediately. In this manner, it is assured that the brake system remains fully operational even in the event of emergency operation when the auxiliary energy supply has failed.

The pressure control arrangements in accordance with the present invention may be of various designs. For instance, the master cylinder device can be constructed as a single piston-type or as a tandem piston-type master cylinder device, wherein the respective master piston has a sleeve seal which performs both a sealing and a valve function, or is equipped with a standard seal which seals the piston relative to the cylinder wall in both directions of flow. The valve means which constitute the establishing and interrupting means, as well as other valve means, may be actuated electromagnetically or, in the alternative mechanically. The apparatus is also suitable for use in a three-circuit brake system, where the pressure supplied by the brake-valve device is utilized in a separate brake circuit with dynamic operation of the wheel brake actuating cylinders. The auxiliary energy supply system is designed as a system using one single type of fluid and advantageously includes a pump, driven by an electric motor, and a high-pressure accumulator. When the auxiliary energy supply system fails, a hydraulically operated closing device shuts off the return conduit from the wheel brake actuating cylinders to the low-pressure hydraulic reservoir, and, simultaneously, the cutoff valve in the hydraulic conduit between the brake-valve device and the master cylinder device is closed so that the hydraulic fluid present in the master cylinder device and in the associated brake circuits is not allowed to escape and an emergency operation of the system is possible without boosting of the brake force and without antiskid control action. In addition, the shutoff valve will also protect, in the event of a defect of a static brake circuit, a dynamic circuit which is possibly connected to the brake-valve device. The closing of the valve device prevents that, in the event that a static circuit becomes defective during the antiskid control operation, the entire auxiliary energy would be lost through this damaged circuit. The shutoff valve is necessary only if the auxiliary pressure of the booster is utilized for a brake circuit to become effective upon failure of the boosting. In an advantageous embodiment of the present invention, the establishing and interrupting means are constructed as an electromagnetically operated three-port two-position valve and the shutoff valve device is constructed as a two-port two-position valve.

In a three-circuit brake system the master cylinder device can advantageously be designed as a tandem master cylinder device with static actuation of two brake circuits of the front axle in the case of a normal braking operation, and the brake-valve device can be provided with an auxiliary energy outlet for dynamic actuation of the rear axle in the third brake circuit.

A normally opened two-port two-position valve which is actuatable in dependence upon the auxiliary energy can be inserted as a hydraulic closing device in the return conduit from the wheel brake actuating cylinders of the front axle and of the rear axle. This valve is constructed to close upon failure of the auxiliary energy.

Advantageously, the outlet of the two-port two-position valve communicates with a compensating chamber connected to the hydraulic reservoir and disposed between the brake-valve device and the tandem master cylinder.

In an alternative embodiment, the interrupting means includes at least one tilting valve which is located in the replenishment chamber of the master cylinder device and which is mechanically actuatable by the associated master piston.

An arrangement which is particularly advantageous and has a simple design is obtained when the shutoff valve and the hydraulic closing device of the return conduits are embodied in a common valve unit.

Expediently, the valve unit comprises a slide piston slidable in a housing and having its one end surface exposable to the auxiliary pressure. This slide piston is held by the auxiliary pressure against the force of a compression spring acting on its other end surface in a floating position in which it provides an open passage through the hydraulic conduit and through the return conduit.

On the other hand, when the auxiliary pressure fails, the slide piston is held by the compression spring in its closing position in which both the hydraulic conduit and the return conduit to the supply reservoir are closed.

Alternatively, the valve unit may be of such a design as to be electromagnetically switched in the presence of auxiliary energy into the open-passage position in which both the hydraulic conduit and the return conduit are open.

When the controlling arrangement is to be used in a dual-circuit brake system it is advantageous when the master cylinder device is designed as a tandem master cylinder having two tilting valves for operating the wheel brake actuating cylinders in a static manner during normal braking operation, and when the brake valve device is designed as a brake booster and, furthermore, when the establishing means for the hydraulic conduit is designed as an electromagnetically actuatable, normally closing two-port two-position valve, with each of the two brake circuits which are actuated statically during normal braking operation being assigned to one vehicle axle.

Alternatively, for use in a three-circuit brake system, the master cylinder device can be designed as a tandem master cylinder having two tilting valves for operating the two brake circuits of the front axle in a static manner during normal braking operation, and the brake-valve device may then be provided with an auxiliary energy outlet for dynamically operating the actuating cylinders of the rear axle which are interposed in the third brake circuit then the establishing means for the hydraulic conduit may advantageously be of an electromagnetically actuatable, normally closed two-port two-position valve, with the return conduit from the wheel brake actuating cylinders of the third, i.e. the dynamic, brake circuit extending to the hydraulic reservoir while by-passing the hydraulic closing device.

In another construction of the present invention for use in a dual-circuit brake system including two braking circuits incorporating wheel brake actuating cylinders in each of the circuits which are diagonally disposed, the master cylinder device is equipped with a tilting valve and the output of the master cylinder device communicates with one of the braking circuits for operating the brake actuating cylinders incorporated therein in a static manner during normal braking operation, while the brake-valve device includes an auxiliary energy outlet for the dynamic operation of the brake actuating cylinders incorporated in the other braking circuit. Then, the establishing means in the hydraulic conduit is advantageously constructed as an electromagnetically actuatable, normally closing two-port two-position valve, with the return conduit of the dynamically operated wheel brake actuating cylinders of the other brake circuit extending to the hydraulic reservoir while by-passing the hydraulic closing device.

In another advantageous construction for use in a dual-circuit brake system, the master cylinder device is designed with two tilting valves for operating the wheel brake actuating cylinders in a static manner during normal braking operation, the brake-valve device being designed as a brake booster, and, moreover, the establishing means in the hydraulic conduit being provided in the form of an electromagnetically actuatable, normally closed two-port two-position valve, with the two brake circuits which are statically operated during normal braking operation being each assigned to one braking circuit incorporating diagonally disposed wheel brake actuating cylinders.

In an improvement of the present invention, the establishing means is designed as a two-port two-position valve and the interrupting means together with the valve device of the hydraulic conduits as well as the hydraulic closing device of the return conduit is designed as a hydraulically actuatable valve unit of a double-piston construction.

In an alternative construction for use in a three-circuit brake system, the master cylinder device is designed as a tandem master cylinder with a static operation of the two brake circuits of the front axle during normal braking operation, and the brake-valve device is designed with an auxiliary energy outlet for dynamic operation of the brake actuating cylinders associated with the rear axle which are incorporated in the third brake circuit, with the return conduit of the dynamic circuit extending through the compensating chamber between the brake-valve device and the tandem master cylinder to the hydraulic reservoir wheel by-passing the valve unit.

On the secondary side of the master piston, there may be provided an axially slidable positioning piston, which is spring-loaded toward an axial stop rigid with the housing and which is sealed relative to the master cylinder housing, the positioning piston having a greater outside diameter than the master piston, the master piston having a rod extending centrally through the positioning piston in a sealed relationship thereto, wherein an enlarged end portion of the master piston rod close to the brake pedal is adapted to be urged into engagement with an assigned circumferential edge of the positioning piston close to the pedal in a substantially central position of the master piston in which the latter is closer to its initial position, when the brake pedal is applied and the secondary side of the master cylinder piston is subjected to auxiliary energy. The positioning piston can be preloaded by a compression spring either in the direction of the pedal force or in opposition to the direction of the pedal force against an axial stop rigid with the housing. The positioning piston which is adapted to be subjected to auxiliary energy during an antiskid control action serves as an axial locking mechanism of the master cylinder piston so that, during an antiskid controlled braking operation, several pressure control cycles can be performed in the wheel cylinders and the brake pedal is not allowed to yield. At the same time, the positioning piston serves as a hydraulic fluid reserve unit in the master cylinder in the event of failure of the dynamic energy. When the brake slip control action is continued, this volume reserve is prevented from being discharged into the hydraulic reservoir by the pressure-responsive return-locking mechanism arranged in the return conduit.

BRIEF DESCRIPTION OF THE DRAWING

Above-mentioned and other features and objects of this invention will become more apparent by reference to the following description taken in conjunction with the accompanying drawings, in which.

DETAILED DESCRIPTION OF THE PREFERRED EMBODIMENTS

Figure 1:
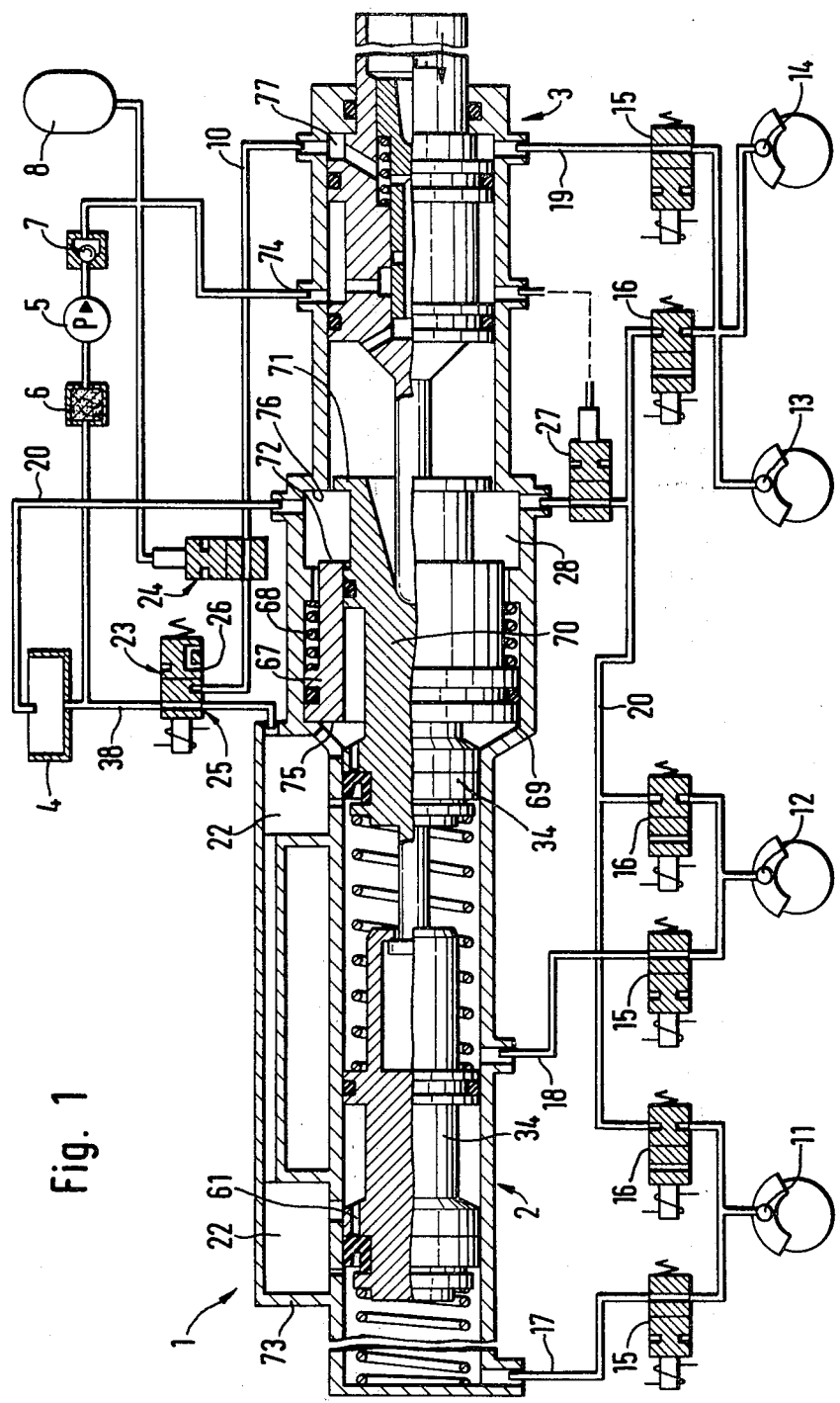
FIG. 1 is a partially cross-sectional diagramatic view of a control arrangement in accordance with the present invention, as employed in a three-circuit brake system, including a tandem master cylinder and a brake booster, wherein the wheel brake actuating cylinders of the front axle are statically operated in two brake circuits and the wheel brake actuating cylinders of the rear axle are dynamically operated in a third brake circuit.

Referring now to the drawing in detail, and first to FIG. 1, thereof, it may be seen that the reference numeral 1 has been used to identify an antiskid control apparatus which includes as two of its main components a master cylinder device 2 and a control valve device 3 arranged in front of the master cylinder device 2 as considered in the direction of a braking force F. The master cylinder device 2 is designed in the construction illustrated in FIG. 1 as a tandem master cylinder, while the control valve device 3 is constructed as a hydraulic brake booster having its control valve member connected to a brake pedal in a conventional manner. Both the brake booster 3 and tandem master cylinder 2 which is situated behind the latter have conventional constructions so that it is not necessary to describe these components 2 and 3 of the control arrangement 1 here in any great detail. It is sufficient for the time being to mention that the master cylinder device 2 includes two pistons which are arranged in tandem and each of which has a replenishment chamber 22 and a feeding bore 61 extending from the secondary side to the working side associated therewith. The two replenishing chambers 22 of the tandem master cylinder device 2 are connected by a hydraulic conduit 10 which constitutes first connecting means with an auxiliary energy outlet of the brake booster 3. Valve means, which will be discussed in more detail, is interposed between the replenishment chambers 22 and the hydraulic conduit 10.

An output of one of the working compartments of the tandem master cylinder device 2 communicates with a first braking conduit 17 of a first (static) braking circuit which incorporates a wheel brake actuating cylinder 11 of the left front wheel of a vehicle. A first electromagnetically actuatable, normally open, two-port two-position valve 15 (so-called SO-valve) is incorporated in the first braking conduit 17. The wheel brake actuating cylinder 11 is further coupled by a return conduit 20 with a low-pressure hydraulic supply reservoir 4. A further electromagnetically actuatable two-port two-position valve 16 which is normally closed and which opens when electric current flows through the actuating part thereof (so-called SG-valve) is incorporated in the return conduit 20 in association with the wheel brake actuating cylinder 11. The two-port two-position valves 15 and 16 are connected to and controlled by an electronic antiskid control device which is of a conventional construction and hence has not been illustrated in the drawing, which control device detects the existence or imminence of impermissibly high values of slip between the tires of the vehicle and the roadway and which correspondingly switches the valves 15 and 16 in a manner which is per se known.

In a similar manner, the output of the other working compartment of the tandem master cylinder device 2 communicates with a second braking conduit 18 incorporating a wheel brake actuating cylinder 12 of the right front wheel, and corresponding two-port two-position valves 15 and 16 are again interposed in the second braking conduit 17 and in the return conduit 20, respectively.

The antiskid control apparatus 1 according to FIG. 1 further includes a third braking conduit 19 constituting a part of a further braking circuit, the third braking conduit 19 being connected to the output of the brake force booster 3 in a manner similar to that in which the hydraulic conduit 10 is connected. The third braking conduit 19 serves for a dynamic control of the operation of wheel brake actuating cylinders 13 and 14 associated with the rear wheels of the vehicle. Similarly to the situation described above in connection with the first and second braking circuits associated with the tandem-master cylinder device 2, a further electromagnetically actuatable and normally open two-port two-position valve 15 is interposed in the third braking conduit 19 and a normally closed electromagnetically actuatable two-port two-position valve 16 is interposed in a section of the return conduit 20 which is associated with the rear axle of the vehicle, these valves 15 and 16 also being connected and controlled by the electronic antiskid control device.

The common return conduit 20 from all of the wheel brake actuating cylinders 11-14 is further provided with a hydraulic shutoff device which is constituted by a two-port two-position shutoff valve 27 which is switchable in dependence on the auxiliary energy and which is normally open and closes when the auxiliary energy fails. The output of two-port two-position shutoff valve 27 is connected to a compensating compartment 28 provided between the braking force booster 3 and the tandem master cylinder 2, while an outlet of this compensating compartment is connected to the low-pressure supply reservoir 4.

The antiskid control arrangement 1 is further equipped with an axuiliary energy supply system including a pump 5 which is powered by an electric motor and a pressure accumulator 8. A filtering unit 6 is arranged between the supply reservoir 4 and the pump 5 and a one-way valve 7 is situated between the pump 5 and the pressure accumulator 8 and is arranged to permit flow of hydraulic fluid in direction from the pump 5 to the reservoir 8 and to prevent flow in the opposite direction. The output of the pressure accumulator 8 is coupled with an input 74 of the braking force booster 3.

The booster input 74 can be connected, in a well-known manner, with the auxiliary energy output of the braking force booster 3 which communicates with the hydraulic conduit 10 in response to the application of the braking force F.

The first master piston 34 of the tandem master cylinder device 2 which is closer to the brake pedal is further equipped at its secondary side with a positioning piston 67 which coaxially and sealingly surrounds a piston rod 70 which is associated with the first master piston 34. The positioning piston 67, the outer diameter of which exceeds that of the first master piston 34, is guided in a sealed manner in an enlarged section of a bore in a master cylinder housing component 73 for axial displacement. A compression spring 68 which is arranged outwardly of the positioning piston 67 and partially surrounds the same urges the positioning piston 67 in the direction of the brake actuating force F toward an axial abutment 69 of the tandem master cylinder housing 73 which extends in the circumferential direction. The first master cylinder piston, the associated piston rod 70, and the positioning piston 67 delimit at the secondary side of the first master piston 34 a sealed compartment which is in communication with the associated replenishing chamber 22. The axial abutment 69 which is rigid with the housing 73 is provided in its circumferential direction with a chamfer so that, when the positioning piston 67 is in abutment with the axial abutment 69, an associated inner circumferential edge portion 75 of the positioning piston 67 is exposed and the corresponding endface of the positioning piston 67 can be subjected to the influence of the axuiliary energy during control action, as will be discussed in more detail later.

The end portion of the positioning piston 67 which is remote from the circumferential edge 75 has a circumferential edge 72 which cooperates, during the use of the control apparatus 1, with an enlarged circumferential end portion 71 of the piston rod 70 in that it engages the same in a substantially central position of the positioning piston 67. The master cylinder housing 73 is further provided, in a manner similar to the provision of the axial abutment 69, with an additional circumferential edge portion 76 which is situated closer to the brake pedal than the abutment 69. The circumferential edge portion 76 constitutes an axial end abutment for the positioning piston 67 when the latter is subjected to the action of the auxiliary energy and when the first master piston assumes an appropriate position as will be explained in detail further on.

The hydraulic conduit 10 which extends from the output of the braking force booster 3 toward the two replenishing chambers 22 of the tandem master cylinder device 2 has first valve means 23 which is normally closed to interrupt communication between the hydraulic conduit 10 and the replenishment chambers 22. The hydraulic conduit 10 constitutes first connecting means which can be hydraulically connected to the replenishment chamber 22, while a return conduit 38 communicating with the supply reservoir 4 constitutes second connecting means of this character. Second valve means 25 is interposed between the return conduit 38 and the replenishment chambers 22 which together constitute a replenishment space and individually communicate with the inlet ports provided in the housing 73. The second valve means 25 normally establishes communication between the replenishment chambers 22 and the return conduit 38. In the construction illustrated in FIG. 1, the first and second valve means 23 and 25 are structurally integrated and constituted by an electromagnetically actuatable three-port two-position valve 26. During normal braking, that is, without antiskid control action, or when the brake pedal is not depressed in the first place, the above-mentioned integrated electromagnetically actuatable three-port two-position valve 26 incorporating the first and second means 23 and 25 assumes the position shown in FIG. 1 in which the communication between the hydraulic conduit or first connecting means 10 and the replenishment chambers 22 is interrupted while communication is established between the replenishment chambers 22 and the return conduit 38 and thus with the low-pressure supply reservoir 4. Only during an antiskid control action, that is, when there is a tendency on the part of at least one of the wheels of the vehicle to lock, is the three-port two-position valve 26 switched into its other position in which it establishes communication between the hydraulic conduit or first connecting means 10 and the replenishment chambers 22 and interrupts communication of the latter with the return conduit or second connecting means 38.

A hydraulically operatable valve unit or cutoff valve 24 is interposed between two sections of the hydraulic conduit or first connecting means 10 which are coupled to the brake force booster device 3, on the one hand, and to the integrated valve 26, on the other hand. The hydraulically operatable cutoff valve 24 is constructed as two-port two-position valve which is open under normal operating conditions, that is, while the auxiliary energy source is fully operational, while it closes when the pressure delivered by the auxiliary pressure source drops below a predetermined threshold or when the auxiliary pressure source fails altogether. The cutoff valve 24 serves as a safety valve which preserves the operatability of the brakes associated with the rear axle of the vehicle when there is a defect in one of the braking circuits associated with the brakes of the respective front wheels of the vehicle which constitutes a drain on the hydraulic fluid delivered by the auxiliary energy source. The two-port two-position valve 27 incorporated in the return conduit 20 also performs a safety function. More particularly, the valve 27 preserves the operatability of the two braking circuits associated with the front wheels when the braking circuit associated with the rear wheels of the vehicle becomes inoperative.

Having so described construction of the antiskid control apparatus 1 according to the present invention as embodied in a hydraulic braking circuit of a vehicle illustrated in FIG. 1, the operation of the control apparatus 1 and of the braking system including the same will now be briefly discussed. In the absence of depression of the brake pedal, that is, when the magnitude of the brake force F is zero, the control valve of the control valve device 3 as well as the two master pistons 34 of the master cylinder device 2 assume their rightmost positions as shown in FIG. 1. The various valves 15, 16, 24, 26, and 27 also assume their positions as illustrated in FIG. 1. Once the brake pedal, which is not shown in FIG. 1, is depressed, it exerts the force F on an inner component of the control valve device 3 and thus displaces the same in the leftward direction as seen in FIG. 1, until the auxiliary energy inlet 74 is connected with the auxiliary energy outlet and thus with the hydraulic conduit 10 as well as with the third braking conduit 19. The wheel brake actuating cylinders 13 and 14 are operated by the pressure prevailing in the third braking conduit 19, the operation being dynamic when a corresponding braking action is exceeded at the rear axle. Inasmuch as the flow through the hydraulic conduit 10 to the replenishing chambers 22 of the master cylinder device 2 is interrupted by the three-port two-position valve 26, pressure simultaneously builds up in an annular outlet compartment 77 of the control valve 3 which is close to the brake pedal, so that the piston of the control valve device 3 is moved toward the left by the pedal force F and the hydraulic force. As a result of this leftward movement, the two master pistons 34 of the tandem master cylinder 2 which are coupled to the piston of the control valve device 3 that acts as a brake force booster are moved or permitted to move in the leftward direction. During this movement, the annular seals carried by the master pistons 34 close compensation bores which have previously connected the respective working compartments with the replenishment chambers 22, whereupon the master pistons 34 cause the pressure in the working compartments to rise, this pressure increase then propagating through the respective first and second braking conduits 17 and 18 and through the then open first, normally open, valves 15 incorporated in the braking conduits 18, to the respective wheel brake actuating cylinders 11 and 12. Thus, the operation of the wheel brake actuating cylinders 11 and 12 by the respective master pistons 34 is static in character. Upon release of the brake pedal, the control valve of the braking force booster 3 is closed so that the auxiliary energy is no longer admitted into the third, dynamic, braking circuit associated with the rear axle; rather, the third braking conduit 19 is connected through the control valve device 3 and the compensating device 28 to the low-pressure supply reservoir 4. As far as the wheel brake actuating cylinders 11 and 12 with the front axle of the vehicle are concerned, the pressure acting thereon is separately reduced in a manner in itself known, due to rightward movement of the two master pistons 34.

When the electronic antiskid control device determines, in a manner which does not form a part of the present invention, that one or more of the vehicle wheels have a tendency to lock, the three-port two-position valve 26 is switched into its control position, which results in a situation where the communication of the replenishment chambers 22 with the supply reservoir 4 is interrupted and communication is established between the hydraulic conduit 10 and the replenishment chambers 22, so that the auxiliary energy is admitted into the replenishment chambers 22 at a level proportionary to the magnitude of the brake operating force F. The hydraulic fluid present in the replenishment chambers 22, the pressure of which has thus been raised to the level proportionate to the magnitude of the force F, flows through the respective inlet ports of the housing component 73 to the secondary side of the respective master pistons 34 and from there through the feeding bores 61 provided in the respective master pistons 34, past the seals carried by the latter which are deflectable for flow in this direction, into the respective working compartments of the master cylinder device 2 and from there, in separate braking circuits including the first and second braking conduits 17 and 18, to the individual wheel brake actuating cylinders 11 and 12 associated with the front axle. Under these circumstances, the front wheel brake actuating cylinders 11 and 12 are operated in a dynamic manner. During the antiskid control action, the corresponding two-port two-position valves 15 and 16 associated with the respective wheel brakes the operation of which is to be controlled are being electromagnetically switched in a manner which is well-known in the antiskid control field, so that some of the hydraulic fluid acting on the wheel brake actuating cylinders 11 and/or 12 is periodically discharged into the return conduit 20 and from there to the shutoff valve 27 which is then in its open position, and through the compensating space 28, into the low-pressure supply reservoir 4.

Figure 2:
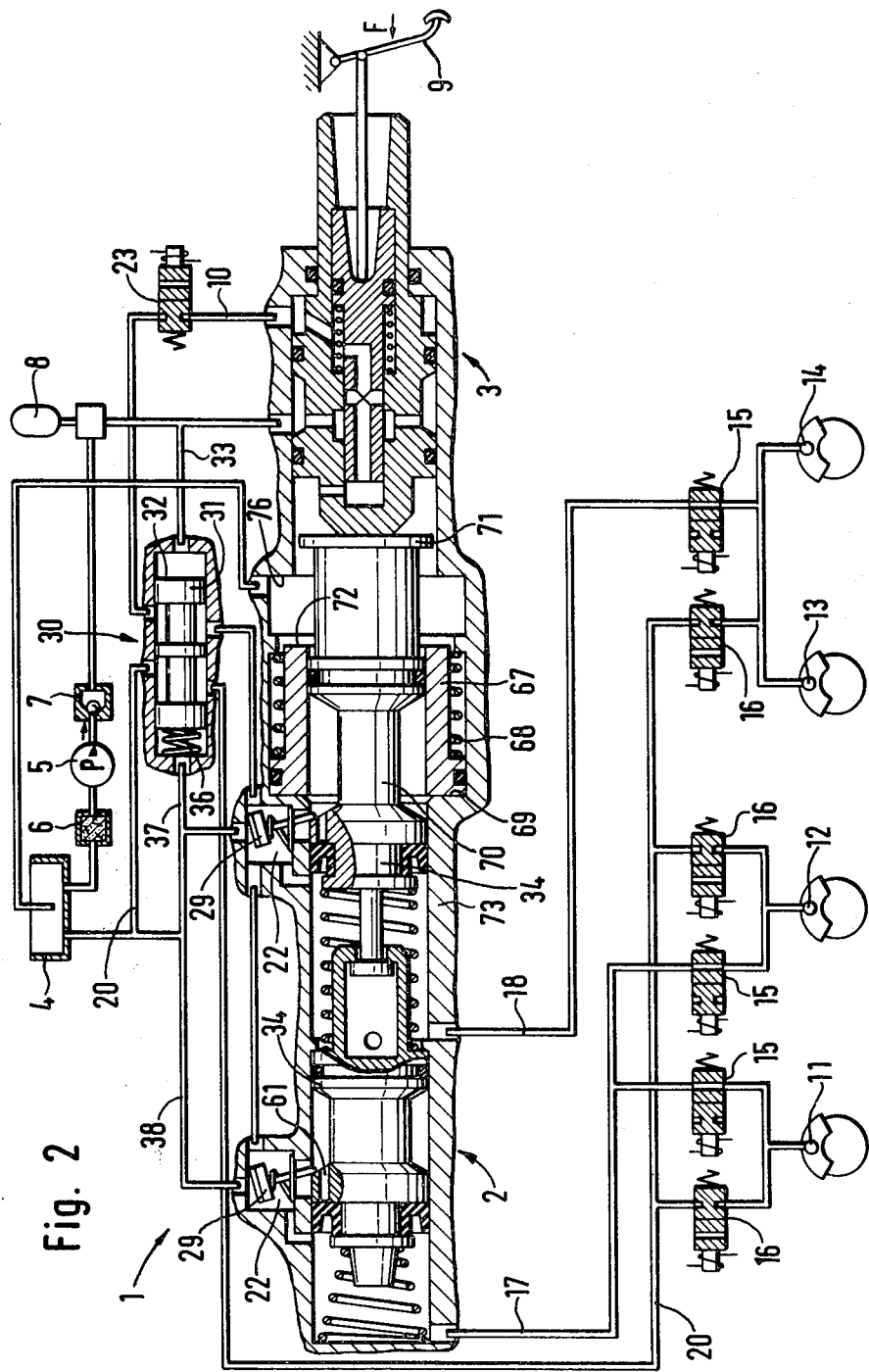
FIG. 2 is a view similar to that of FIG. 1 but with a control arrangement as employed in a dual-circuit brake system with a tandem master cylinder wherein the brake actuating cylinders associated with each vehicle axle are individually statically operated.

During the antiskid control action, the controlled auxiliary energy pressure simultaneously displaces the positioning piston 67, due to the pressure prevailing at the secondary side of the first master piston 34 which is closer to the brake pedal, opposite to the force of the compression spring 68 in the rightward direction as considered in FIG. 1, until the circumferential edge 72 thereof abuts the associated enlarged circumferential end portion 71. This assures, under all circumstances, that the first master piston 34 cannot move too far in the leftward direction and that the brake pedal cannot travel through an unsupportably large distance. This means that the volume of the hydraulic fluid enclosed in the master cylinder 2 cannot be completely exhausted. The circumferential end portion 71 of the first master piston 34 is illustrated in FIG. 1 as being located at the circumferential edge portion 76, from which it can move only in the leftward direction. However, the piston rod 70 of the first master piston 34 could also be longer than shown, in which case the circumferential end portion 71 would be situated to the right from the circumferential edge portion 76 in the most rightward position of the first master piston 34, as is shown in FIG. 2. Under these circumstances, when the first master cylinder piston 34 is not yet displaced in the leftward direction to such an extent that the enlarged circumferential end portion 71 of the first master piston 34 is closer to the circumferential edge 72 of the positioning piston 67 then the circumferential edge portion 76 of the tandem master cylinder housing 73 which is adapted to serve as an abutment for the positioning piston 67, the positioning piston 67 is free to move in the rightward direction until the circumferential edge 72 thereof abuts the circumferential edge portion edge 6. In this position, the positioning piston 67 is out of contact with the circumferential end portion 71, but is ready to serve as a yieldable abutment for the circumferential end portion 71 once the first master piston 74 is displaced to a sufficient extent in the leftward direction due to the action of the force F and/or of the hydraulic pressure in the compartment 77 via the piston of the control valve device 3 on the piston rod 70 of the first master piston 34. When this happens, the positioning piston 67 again assures that a sufficient amount of hydraulic fluid remains in the master cylinder device 2, even when there is a tendency for excessive displacement of the brake pedal due to the performance of several control cycles with respect to the brake actuating cylinders 11 or 12 associated with the front axle.

Accordingly, the pressure of the auxiliary energy has the effect of preventing further depression of the brake pedal once the circumferential end portion 71 and the circumferential edge 72 engage one another in that the pressure acting on the circumferential edge 75 of the positioning piston 67 causes the positioning piston 67 to move again in the rightward direction until the circumferential edge 72 of the positioning piston 67 again abuts the circumferential edge portion 76 of the housing component 73, while the first master piston 34 is entrained by its circumferential end portion 71 for joint movement with the positioning piston 67 in the rightward direction in the event that it has previously moved too far in the leftward direction.

Should there develop a problem in one of the braking circuits incorporating the wheel brake actuating cylinders 11 or 12 associated with the front axle so that such defective circuit would constitute a drain on the entire braking system, the auxiliary energy dependent hydraulically actuatable cutoff valve 24 interposed in the hydraulic conduit 10 moves into its closed position, so that the auxiliary energy cannot be drained through the defective braking circuit during the operation in the antiskid control mode and it is thus assured that the dynamically controlled wheel brake actuating cylinders 13 and 14 associated with the rear axle remain operational.

The shutoff valve 27 interposed in the return conduit 20, which is provided in addition to the cutoff valve 24, is normally open and it closes when the pressure of the auxiliary energy decreases below a predetermined threshold value. In this manner it is prevented that the hydraulic fluid present in the braking circuits associated with the front wheels would be lost through the corresponding valves 16 as they periodically open during the antiskid control action, when the braking circuit associated with the rear axle fails or when the auxiliary energy source fails.

FIG. 2 shows a modified version of the antiskid control apparatus 1 which is similar to that illustrated in FIG. 1 in so many respects that the same reference numerals have been used therein to identify the corresponding parts. The master cylinder device 2 of this apparatus is constructed as a tandem master cylinder including the positioning piston 67, while the control valve device 3 which is arranged in front of the tandem master cylinder device 2 is constructed in a conventional manner as a braking force booster which is operatable by a brake pedal.

In contradistinction to the apparatus 1 illustrated in FIG. 1, the control valve device 3 is not connected to any further dynamically operated braking circuit; rather, the apparatus 1 cooperates with only two braking circuits, a first of which includes the braking conduit 17 leading to the wheel brake actuating cylinders 11 and 12 associated with the wheels of the front axle while the other includes a braking conduit 18 leading to the wheel brake actuating cylinders 13 and 14 associated with the wheels of the rear axle. The conduits 17, 18 and 20 are so branched, and the valves 15 and 16 are so interposed in the branched to conduits 17, 18 and 20 that they commonly control the admission of hydraulic fluid into and discharge from the rear wheel brake actuating cylinders 13 and 14, while they individually control the admission of hydraulic fluid into and its discharge from the front wheel brake actuating cylinders 11 and 12. The return conduit 20 which is common to all of the wheel brake actuating cylinders 11 to 14 unlike in FIG. 1, no longer passes through a structurally separate hydraulic shutoff valve 27. Rather, it passes through a hydraulic valve unit 30 which also performs the function of the return conduit shutoff valve. The valve unit 30 is shown in greater detail in FIG. 6 and will be subsequently described in detail. The hydraulic conduit 10 which leads from the auxiliary output to the replenishment chambers 22 includes as the establishing or first valve means 23 an electromagnetically actuatable normally closed two-port two-position valve which is open during the antiskid operation. The separate cutoff valve 24 of FIG. 1 which is hydraulically actuatable by the auxiliary energy is absent from the apparatus 1 of FIG. 2, but its function is performed by the valve unit 30 which is arranged downstream of the two-port two-position valve 23 in the hydraulic conduit 10. The auxiliary energy output of the normally open valve unit 30 is connected to the replenishment chambers 22 associated with the respective master pistons 34. The function of the second valve means 25 of FIG. 1 is performed in the apparatus 1 of FIG. 2 by two spring-loaded tilting valves 29 which are respectively accomodated in the associated replenishment chambers 22 and which are mechanically actuated by the associated master pistons 34 in the inactive position of the braking systems into the position in which they permit communication of the replenishment chambers 22 with the return conduit 38. The tilting valves 29 are shown in FIG. 2 in their tilted or communication-establishing positions.

The return conduit 38 which serves as a compensating conduit for the master cylinder 2 merges with a section of the return conduit 20 situated downstream of the valve unit 30 to then jointly lead to the low-pressure supply reservoir. The return conduit 38 is further connected with a compensating conduit 37 which communicates with a compensating compartment delimited by one endface 35 of a valve slide 31 of the valve unit 30. A compression spring 36 is accommodated in the compensating compartment and acts on the one endface 35 to urge the valve slide 31 in the rightward direction as considered in FIG. 2. Another endface 32 of the valve slide 31 delimits a pressure compartment which communicates, via a pressure conduit 33 with the pressure accumulator 8 as may be seen in FIG. 6. The conduit 37 communicates with a port B2 and the conduit 33 with a port SP of the valve unit 30.

The valve slide 31 is movably received in the interior of the valve unit 30. As may be seen particularly in FIG. 6, when the auxiliary energy source is operational, the hydraulic fluid which is admitted into the pressure compartment through the port SP act the other end face 32 of the valve slide 31 and displaces the latter against the opposition of the compression spring 36 acting on the one end face 35 into a possibly floating doubly connecting position approaching or reaching the position illustrated in FIG. 6. In the doubly connecting position, the valve unit 30 permits the hydraulic fluid to flow between ports GD and B3 which communicate with two sections of the hydraulic conduit 10, on the one hand, and between ports SG and B1 which communicate with two sections of the return conduit 20. Thus, in the construction illustrated in FIG. 2, all of the valve means which are to be controlled in dependence on the auxiliary energy (the shutoff valve means in the return conduit 20 and the cutoff valve means in the hydraulic conduit 10) are united in a structurally advantageous manner in the valve unit 30.

During the operation of the antiskid control device 1 as constructed and incorporated in the braking system in accordance with FIG. 2, the wheel brake actuating cylinders 11 to 14 are operated in response to the depression of the brake pedal 9 in the direction of the brake force F in a conventional manner in two separate braking circuits including the first and second braking conduits 17 and 18 and the return conduits 20, the operation control being static in the absence of danger of skidding. During the static operation control, the two-port two-position valve 23 interposed in the hydraulic conduit 10 is closed and, consequently, the control valve device 3 operates as a braking force booster. The two conduits 10 and 20 associated with the valve unit 30 are unobstructed under normal circumstances, that is, when the auxiliary energy source is operational.

Once there arises the need for antiskid control action, the two-port two-position valve 23 is switched over into its open position, so that the positioning piston 67 is moved to the right, as considered in FIG. 2, until it abuts the circumferential edge portion 76 of the master cylinder housing 73 or, depending on the position of the right-hand master piston 34, until it abuts the enlarged circumferential end portion 71 of the right-hand master piston 34. In this manner, there is maintained a reserve of the hydraulic fluid in the master cylinder device 2 is the same manner as discussed above in connection with FIG. 1.

When the pressure of the hydraulic fluid delivered by the auxiliary energy source decreases, the force with which this hydraulic fluid acts on the other end face 32 of the valve slide 31 also decreases so that the force of the compression spring 36 gradually displaces the valve slide 31 of the valve unit 30 in the rightward direction as considered in FIG. 2, until the valve slide 31 interrupts the communication between the section of the hydraulic conduit 10 as well as between the sections of the return conduit which are connected to the valve unit 30. While it is true that, when this happens, it is no longer possible to perform the antiskid control action, it is also true that this expedient assures, in the case of an emergency, that the hydraulic fluid remains in the master cylinder device 2 and in the associated braking circuits and that such hydraulic fluid cannot escape into the low-pressure supply reserovir 4. In this manner, there is assured an emergency braking action with a static control of the wheel brake actuating cylinders 11 to 14 without braking force boosting.

Figure 3:
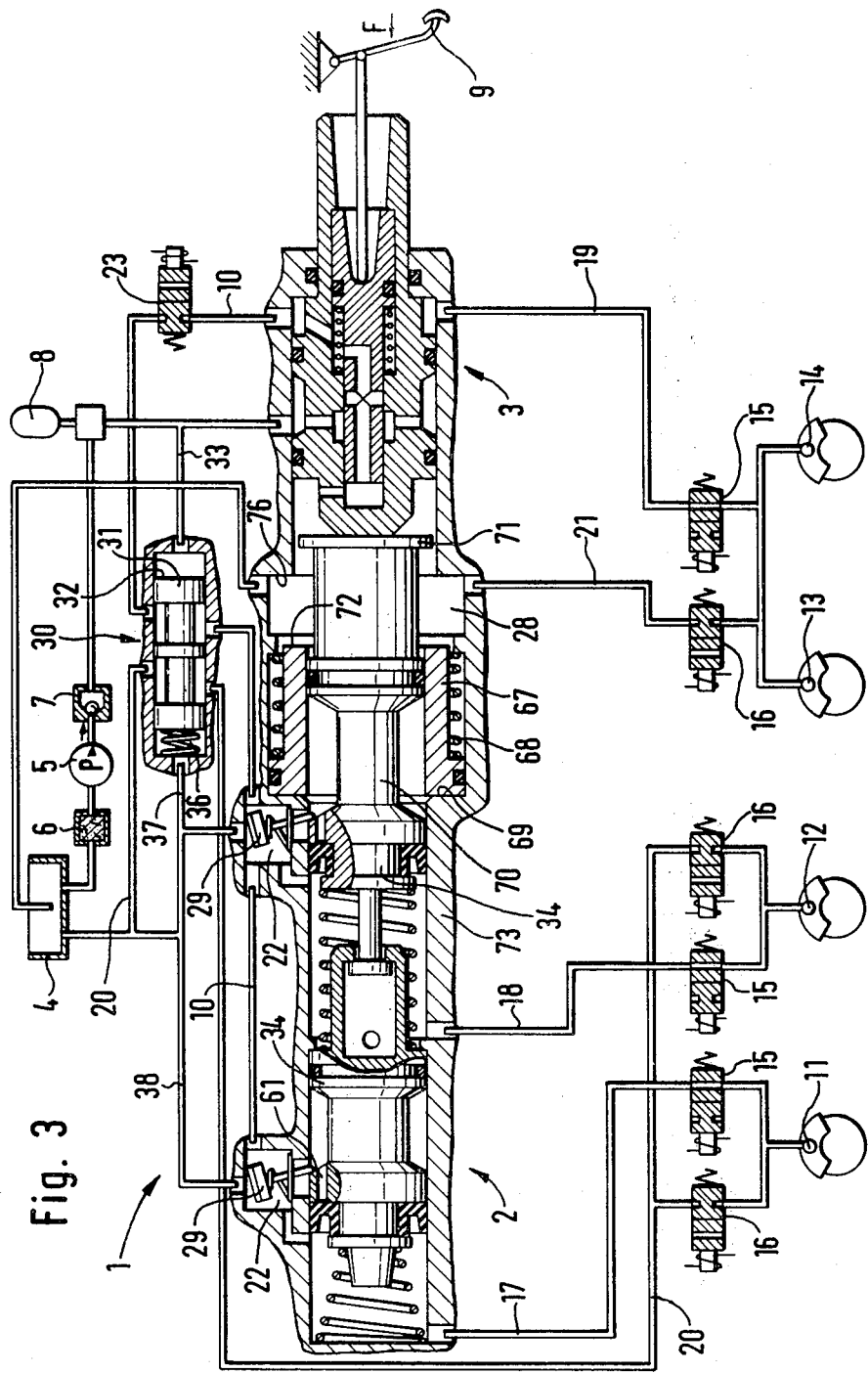
FIG. 3 is a view similar to that of FIG. 2 but having a dynamic circuit for dynamic operation of the wheel brake actuating cylinders associated with the rear axle, while the wheel brake actuating cylinders of the front axle are individually operated in a static manner.

The modified version of the antiskid control apparatus 1 illustrated in FIG. 3 corresponds in many respects to the antiskid control apparatus 1 of FIG. 2 so that, once more, the same reference numerals have been used to identify corresponding parts. However, in contradistinction to the construction illustrated in FIG. 2, the antiskid control apparatus cooperates with three-circuit braking system including the third braking conduit 19 and an additional return conduit 21. In this modification, the first and second braking circuits include the first and second braking conduits 17 and 18 which communicate with the outlet ports of the master cylinder device 2 and the common return conduit 20 respectively associated with the front wheel brake actuating cylinders 11 and 12, while the third circuit including the third braking conduit 19 which communicates with the auxiliary energy outlet of the control valve device 3 and the additional return conduit 21 is associated with the rear wheel brake actuating cylinders 13 and 14 and renders it possible to dynamically control the operation thereof. The additional return conduit 21 communicates with the compensating compartment 28 arranged between the control valve device 3 and the master cylinder device 2, from where it leads to the low-pressure supply reservoir 4 while bypassing the valve unit 30. The apparatus 1 of FIG. 3 operates basically in the same manner as that discussed above in connection with FIG. 2, so that the operation need not be discussed here in any further detail.

Figure 4:
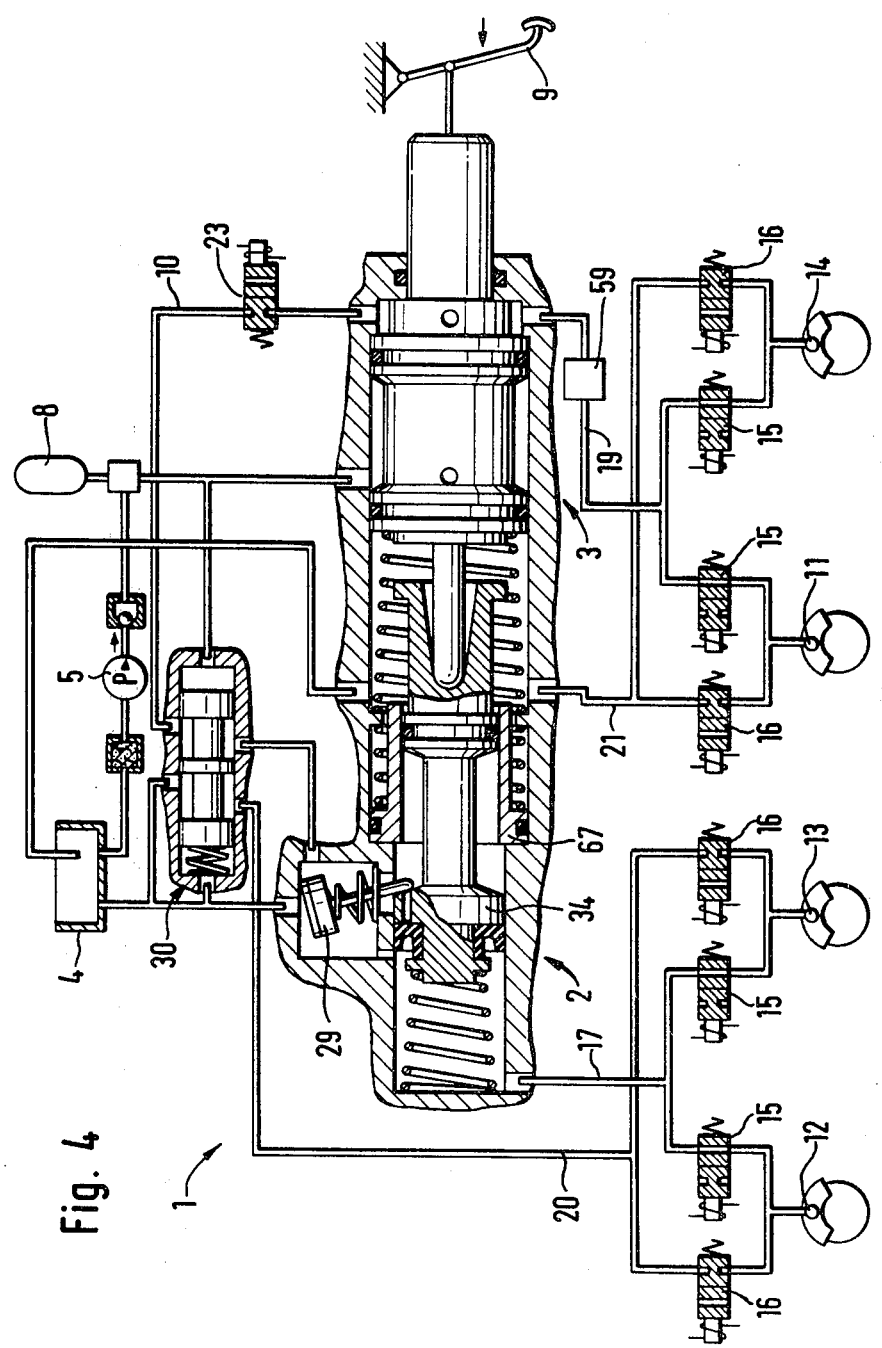
FIG. 4 is a view similar to that of FIG. 3 but of a control arrangement having a single-type master cylinder for use in static operation of diagonally arranged wheel brake actuating cylinders included in one brake circuit, as well as a further dynamic circuit connected to the brake-valve device for the purpose of actuation of the remaining diagonally arranged wheel brake actuating cylinders.

The construction illustrated in FIG. 4 includes a single-piston master cylinder device 2 which is connected through the first braking conduit 17 to the wheel brake actuating cylinders 12 and 13 which are associated with diagonally disposed vehicle wheels for static operation of such wheel brake actuating cylinders 12 and 13. The control valve device 3 of the apparatus 1 of FIG. 4 is connected through the third conduit 19 with the wheel brake actuating cylinders 11 and 14 associated with the remaining, also diagonally disposed, vehicle wheels for dynamic operation of the same. Here again, similarly to the construction illustrated in FIG. 3, the separate additional return conduit 21 leads directly to the low-pressure supply reservoir 4 while bypassing the valve unit 30. An equalizing valve 59 is arranged in the third braking conduit 19 and is effective for equalizing the pressure in the dynamic circuit with that in the static circuit. The operation of the construction of FIG. 4 is so similar to that discussed above in connection with FIGS. 2 and 3 that it need not separately discussed here.

Figure 5:
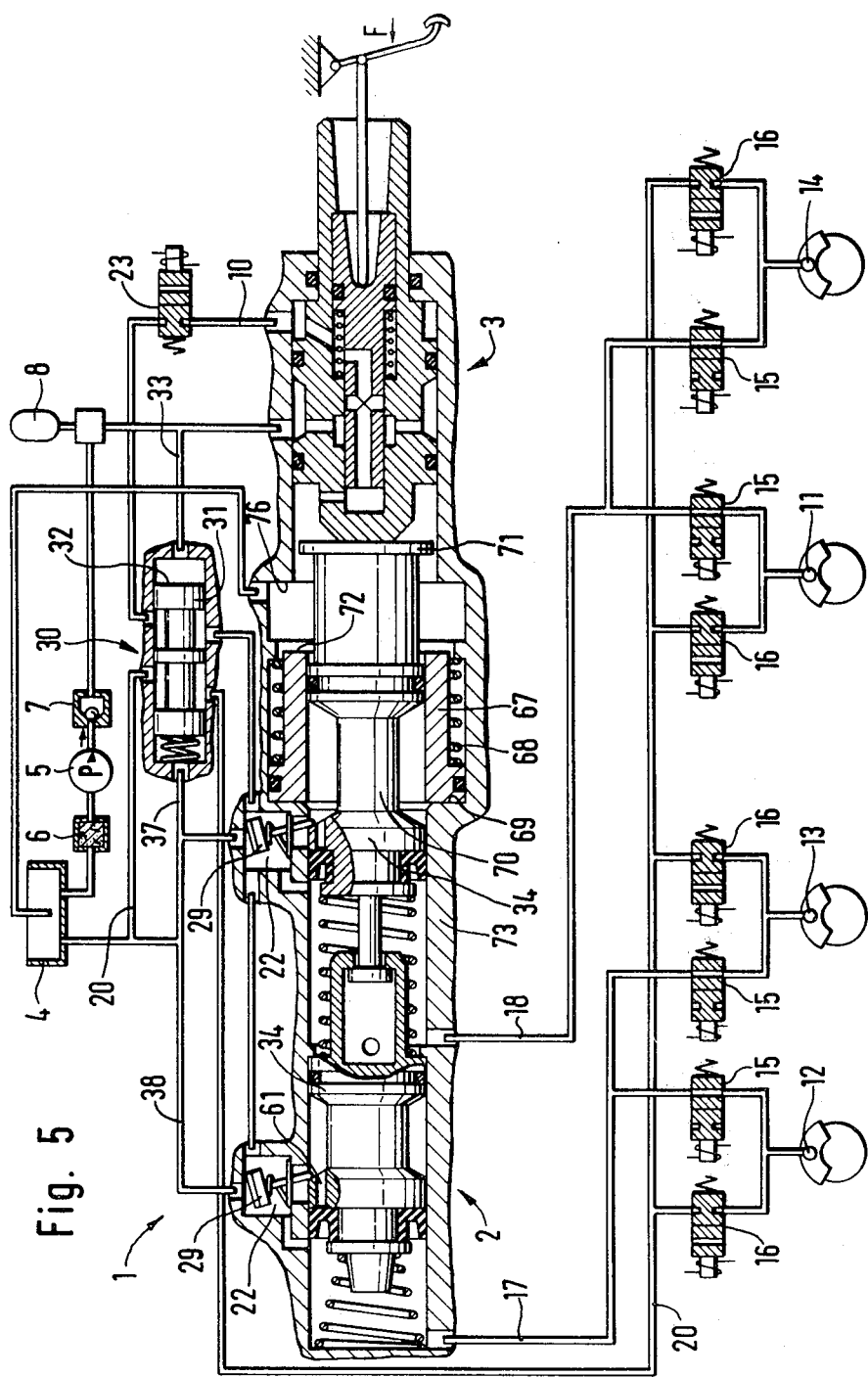
FIG. 5 is a view similar to that of FIG. 4 but with the control arrangement as employed in a braking system having two static brake circuits which are associated with the vehicle axles or with the vehicle diagonals.

The construction illustrated in FIG. 5 basically corresponds to that according to FIG. 2; however, the two braking circuits controlled by the master cylinder device 2 are respectively associated with wheel brake actuating cylinders 12 and 13, on the one hand, and 11 and 14 on the other hand, for braking the wheels which are disposed diagonally with respect to one another in each instance. The operation of each wheel brake actuating cylinder 11 to 14 is individually controlled by associated control valves 15 and 16.

Figure 6:
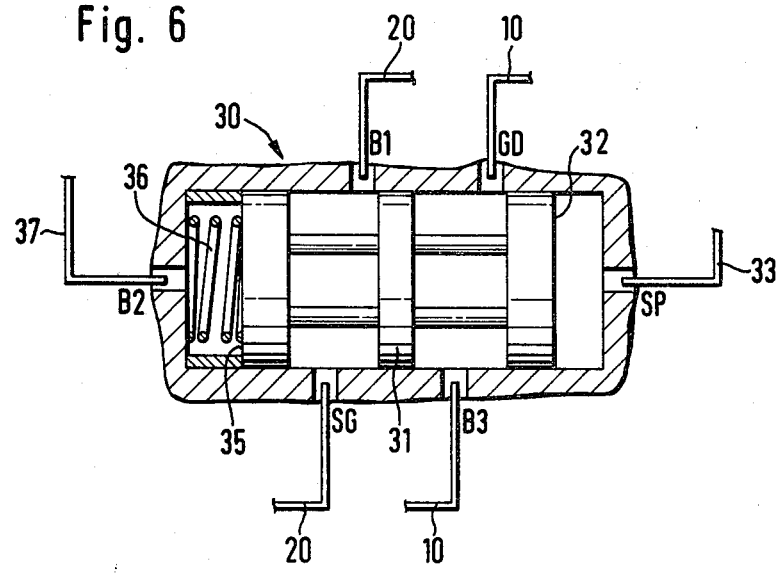
FIG. 6 is an enlarged view of a detail of FIGS. 2 to 5.
Figure 7:
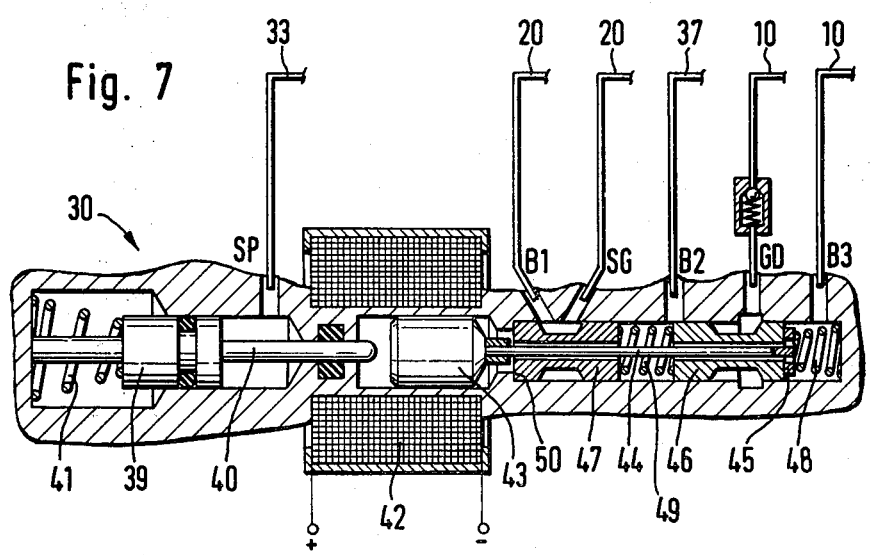
FIG. 7 is an alternative embodiment of the detail according to FIG. 6.

FIG. 7 depicts a valve arrangement which corresponds as to its basic construction to the valve unit 30 of FIG. 6 which has been discussed in detail in connection with FIG. 2. The valve arrangement of FIG. 7 provides two open positions for hydraulic conduit 10 as well as for the return conduit 20 in dependence on the auxiliary energy pressure acting thereon as supplied by the pressure conduit 33. Those ports which correspond to the ports of the valve unit 30 according to FIG. 6 are identified by the same reference characters. When the auxiliary energy source is operational, the auxiliary pressure is supplied to the port SP and displaces a piston 39, and with it a piston rod 40, opposite to the force of a compression spring 41 in the leftward direction as considered in FIG. 7. When an electromagnetic coil 42 is energized, a switching piston 43 is brought into its leftward position as considered in FIG. 7. An entraining rod 44 rigidly connected with the switching piston 43 entrains, via an abutment member 45, a first tubular member 46 for joint travel therewith, until the rightward edge portion thereof as seen in the drawing permits communication between the port GD and the port B3. At the same time, a second tubular member 47 is held by compression springs 48 and 49 in abutment with a stop 50 of the housing. Due to the position assumed by the second tubular member 47, there is established communication between the port B1 and the port SG. In the event of failure of the auxiliary energy source, the compression spring 41 moves the piston 39 and its piston rod 40 in the rightward direction as considered in the drawing until the second tubular member 47 obstructs the port B1. Simultaneously therewith, the rightward control edge of the first tubular member 46 as seen in the FIG. 7 moves across the port GD so that even the communication between the ports GD and B3 is interrupted. The parts 45 and 46 do not form a seat valve.

Figure 8:
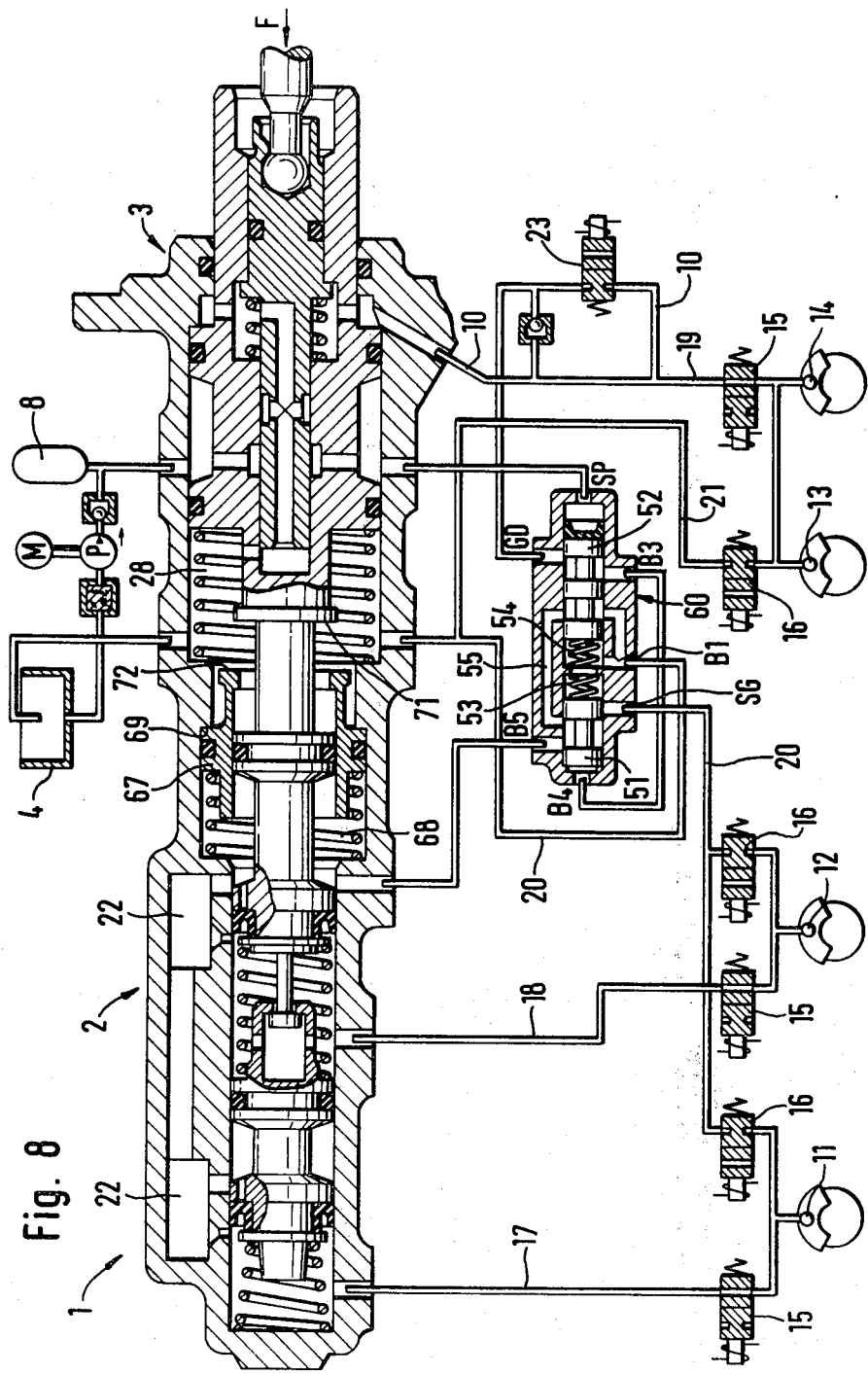
FIG. 8 is a view similar to that of FIG. 5 but including a control arrangement, having a preferably hydraulically actuatable valve unit.

The construction of the antiskid control apparatus 1 illustrated in FIG. 8 basically corresponds to the constructions discussed above and includes a tandem master cylinder device 2. The apparatus 1 of FIG. 8 cooperates with two static braking circuits and one dynamic braking circuit. The wheel brake actuating cylinders 13 and 14 associated with the rear axle are interposed in the dynamic braking circuit and are controlled in common by control valves 15 and 16. The common additional return conduit 21 of the dynamic braking circuit passes through the compensating space 28 to the low-pressure hydraulic supply reservoir 4. The wheel brake actuating cylinders 11 and 12 associated with the front wheels are controlled in a static manner in separate braking circuits including braking conduits 17 and 18, respectively and are individually controlled by associated control valves 15 and 16. The first valve means or establishing means 23 in the hydraulic conduit 10 is constructed in the same manner as in the constructions of FIGS. 2 to 5 and is constituted by an electromagnetically actuatable normally closed two-port two-position valve. In an alternative construction differing from that discussed above, the positioning piston 67 is pressed by the compression spring 68 into engagement with either axial abutments 69, in opposition to the brake pedal force F. When the braking system is actuated, the enlarged circumferential end portion possibly engages the associated circumferential edge of the positioning piston 67, while an axial movement of the positioning 67 is possible in the leftward direction as considered in FIG. 8 in the absence of antiskid control action. On the other hand, during the antiskid control action the positioning piston 67 is acted upon by the auxiliary energy pressure and is thus held in its then assumed axial position, so that a further depression of the braking pedal 9 is prevented. During the antiskid control action, the positioning piston 67 always takes up the position illustrated in FIG. 8. The compression spring 68 is so dimensioned that it is just capable of overcoming the friction forces of the sealing elements cooperating with the positioning piston 67.

The arrangement according to FIG. 8 includes an especially advantageous unit 60 which is actuatable purely hydraulically and includes all valve except for the electromagnetically actuatable first valve means 23 in a structural unit. Such structural unit 60 incorporates the shutoff valve 27, the second valve means or interrupting means 25 as well as the cutoff valve 24 of the above-discussed constructions.

The valve unit 60 includes a valve housing having an internal bore which is subdivided into two chambers. Valve slides 51 and 52 are respectively received in one and in the other chamber The two valves 51 and 52 are urged by springs 53 or 54 away from one another. The left valve slide 51 as considered in FIG. 8 is urged by the spring 53 into abutment with a stop which is rigid with the housing, while the other valve slide 52 is held during the operation in a floating axial position similar to that described above in connection with the valve unit 30 of the previous constructions, when auxiliary energy pressure supplied through the port SP acts on the right end face of the valve slide 52 as considered in the drawings. Each of the two valve slides 51 and 52, which are arranged in axial alignment with one another, cooperates with an inner connecting conduit 55. Ports SP, GD, B3, SG and B1 are also provided which correspond to the ports discussed above in connection with the valve unit 30 of the previously discussed construction. Furthermore, the valve unit 60 is provided at its axial end which is remote from the port SP with a further port B4, as well as with a further radial port B5 cooperating with the valve slide 51 and in communication with the replenishment chamber 22.

When the braking system is not being used, the compensating conduit 38 of the master cylinder 2 communicates, via the port B5, the inner connecting conduit 55 and the port B1 with the low-pressure hydraulic supply reservoir 4 wherein the return flow takes place through the compensating space 28.

In the event that antiskid control action is called for during the braking operation, the electromagnetically actuatable valve 23 is switched into its open position so that, based on the open position of the second valve slide 52 which establishes communication between ports GP and B3, pressurized hydraulic fluid is delivered to the port B4 to thus act on corresponding endface of the first valve slide 51. This hydraulic pressure moves the first valve slide 51 oppositely to the force of the compression spring 53 in the rightward direction as considered in the drawing, so that the port B5 is connected with the port B4, and simultaneously the port SG is unobstructed, so that the port SG communicates via the inner connecting conduit 55 with the port B1 and, in this manner, a flow path is established in the return conduit 20 to the low-pressure hydraulic supply reservoir 4.

Should the pressure of the auxiliary energy drop below a predetermined threshold or should the auxiliary energy source fail altogether, the second valve slide 52 is moved by the force of the compression spring 54 in the rightward direction as considered in FIG. 8 so that it interrupts communication between the ports GD and B3, as well as the communication between the ports SG and B1. This occures independently of the position assumed by the first valve slide 51. The compression springs 53 and 54 are situated in internal compartments which are connected by a return conduit with the low-pressure supply reservoir 4.

It may be seen from the above explanation that the present invention provides an antiskid control apparatus for use in a hydraulic vehicle braking system which is supplied with auxiliary energy, and in which the master cylinder device includes at least one circumferentially sealed master piston which cooperates with an associated replenishment chamber and which is provided with a feeding bore. A brake pedal actuated control valve arrangement is arranged between the master cylinder device and the brake pedal as seen in the axial direction, and it is capable of feeding the auxiliary energy from an auxiliary energy supply system or source including a hydraulic reservoir, a pump, a pressure accumulator, as well as corresponding connecting conduits, in proportion to the force acting on the brake pedal. Electromagnetically actuatable control valves in the braking circuit render it possible to control and avoid the possibility of locking of the wheels by controlling the operation of the wheel brake actuating cylinders. Furthermore, there is provided a return conduit to the hydraulic reservoir which incorporates a normally open hydraulic shutoff valve which closes when the pressure of the auxiliary energy drops below a predetermined threshold value. The output of the control valve device is connected through a hydraulic conduit with the replenishment chamber of the master cylinder device. First valve means which are electromagnetically actuatable and which normally interrupt the flow of the fluid through the hydraulic conduit are interposed in the hydraulic conduit. Such first valve means permit flow of the fluid through the hydraulic conduit when the respective vehicle wheel has a tendency to lock, that is, when there is a need for antiskid control action. There are further provided second valve means which connect the replenishment chamber with the hydraulic container when the brake pedal is its rest position, while they discontinue such communication during the antiskid control action. When the auxiliary energy pressure drops below a predetermined threshold value, a normally closed valve arrangement which is actuatable in dependence on the pressure of the auxiliary energy is moved into closed position. The first and second valve means can be constituted by an electromagnetically actuatable three-port two-position valve. In the alternative, the first valve means are constructed as an electromagnetically actuatable two-port two-position valve. All of the valves which are hydraulically actuatable in depedence on the pressure of the auxiliary energy can be structurally incorporated in a unit. The master cylinder performs a normal function during the normal braking operation, and braking force boosting is possible during such normal braking operation. During an antiskid control operation, the static braking system is converted into an auxiliary force braking system by admitting the control pressure of the control valve device into the static braking circuits. In this manner, there is obtained a simple antiskid control apparatus which is very effective as far as its operation is concerned and which includes simple hydraulic or electrohydraulic components. The braking system requires actively low amount of auxiliary energy and is suited for use in single circuit as well as in multiple circuit braking systems during the static as well during the dynamic control of the operation of the wheel brake actuating cylinders.

While we have described above the principles of our invention in connection with specific apparatus, it is to be clearly understood that this description is made only by way of example tnd not as a limitation to the scope of our invention as set forth in the accompanying claims.

We claim:

1. An arrangement for controlling the pressure of a hydraulic braking fluid in brake actuating cylinders incorporated in a hydraulic braking system, especially that of a motor vehicle, having antiskid control equipment and a supply reservoir, in dependence on the position of a brake operating member movable from a rest position into a plurality of operating positions, comprising
   a master cylinder device including a housing component defining at least one bore and having at least one inlet port communicating with said bore, and at least one master piston received in said bore for movement axially thereof;
   means for replenishing the supply of hydraulic fluid in said bore, including an auxiliary source of pressurized hydraulic fluid, means defining at least one replenishment space communicating with said inlet port, and first and second connecting means for respectively connecting said replenishment space with said auxiliary source and with the reservoir;
   means for establishing communication between said replenishment space and said first connecting means only during the control action of the antiskid control equipment; and
   means for interrupting communication between said replenishment space and said second connecting means at least during the control action.

2. The arrangement as defined in claim 1, wherein said interrupting means is operative for interrupting communication between said replenishment space and said second connecting means at least while the brake operating member is in its rest position.

3. The arrangement as defined in claim 1, wherein said establishing and interrupting means are incorporated in a common valve having a first port communicating with said replenishment space, a second port communicating with said first connecting means, and a third port communicating with said second connecting means and including a valve member movable between a first position in which it connects said first and second ports, and a second position in which it connects said first and third ports of said common valve with one another.

4. The arrangement as defined in claim 1, and further comprising a cutoff valve interposed in said first connecting means and switchable in dependence on the pressure of the hydraulic fluid from said auxiliary source between an open position assumed when said auxiliary source is operational and a closing position assumed when said auxiliary source fails.

5. The arrangement as defined in claim 4, wherein said cutoff valve is interposed between two sections of said first connecting means and includes a valve housing having one port communicating with one of said sections and another port communicating with the other section, and a valve member movable in said valve housing between a first position in which it establishes, and a second position in which it interrupts, communication between said ports of said valve housing.

6. The arrangement as defined in claim 1, for use in a vehicular braking system having three separate braking circuits, a first and a second of which respectively incorporate the front wheel brake actuating cylinders and a third of which incorporates the rear wheel brake actuating cylinders, wherein said replenishing means further includes a control valve device having an inlet port communicating with said auxiliary source and an outlet port communicating with the third circuit; and wherein said master cylinder device further includes an additional master piston movably received in said bore in tandem with said one master piston, said master pistons having respective end faces delimiting respective working compartments in said bore, and said housing component including an additional inlet port cooperating with said additional master piston and also communicating with said replenishment space, and two outlet ports respectively coupling one of said working compartments with the first circuit and the other working compartment with the second circuit.

7. The arrangement as defined in claim 6 for use in a vehicular braking system including at least one return conduit from the actuating cylinders to the reservoir, and further comprising at least one shutoff valve incorporated in the return conduit and movable from its open to its closed state only when said auxiliary source fails.

8. The arrangement as defined in claim 7, wherein said control valve device is disposed between the brake operating member and said master cylinder device and has a housing part forming an extension of said housing component toward the brake operating member and bounding another bore registering with said one bore, and a control valve received in said other bore and delimiting a return chamber included in the return conduit downstream of said shutoff valve.

9. The arrangement as defined in claim 1, wherein said defining means forms a replenishment chamber adjacent to said housing component at said inlet port and constituting at least a part of said replenishment space.

10. The arrangement as defined in claim 9, wherein said interrupting means includes at least one interrupting valve mounted in said replenishment chamber for tilting between an opening and a closing position and mechanically operatable by said master piston for tilting into at least one of said positions thereof.

11. The arrangement as defined in claim 1 for use in a vehicular braking system including at least one return conduit from the actuating cylinders to the reservoir, and further comprising a valve unit including a valve member having a cutoff portion interposed in said first connecting means and movable in dependence on the pressure of the hydraulic fluid from said auxiliary source between an open and a closed position, and a shutoff portion interposed in the return conduit and movable in dependence on the pressure from the auxiliary source between its open and closed positions, said portions assuming said closed positions thereof only when the auxiliary source fails.

12. The arrangement as defined in claim 1, wherein said valve unit includes a housing defining an internal bore, said valve member being a slide received in said bore for axial movement therein and having one end face delimiting a control compartment in said bore, another end face, and said portions therebetween, said valve unit further including a spring acting on said other end face and urging said slide towards said closed position, and means for admitting the hydraulic medium from said auxiliary source into said control compartment to act on said one end face of said slide in opposition to the force of said spring.

13. The arrangement as defined in claim 11, and further comprising electromagnetically operated means for moving said portions between said open and closed positions thereof.

14. The arrangement as defined in claim 1 for use in a vehicular braking system having two separate braking circuits which respectively incorporate the front wheel and rear wheel actuating cylinders, wherein said replenishing means further includes a braking force booster; wherein said master cylinder device further includes an additional master piston movably received in said bore in tandem with said one master piston, said master pistons having respective end faces delimiting respective working compartments in said bore, said housing component including an additional inlet port cooperating with said additional master piston and also communicating with said replenishment space, and two outlet ports respectively coupling one of said working compartments with one, and the other working compartment with the other, of the braking circuits; wherein said defining means forms two replenishment chambers each adjacent to said housing component at one of said inlet ports and forming a part of said replenishment space; and wherein said interrupting means includes two interrupting valves each mounted in one of said replenishment chambers for tilting between an opening and closing position and mechanically operatable by the respectively associated master piston for tilting into at least one of said positions thereof.

15. The arrangement as defined in claim 14, wherein said establishing means includes an electromagnetically operated valve.

16. The arrangement as defined in claim 1 for use in a vehicular braking system having three separate braking circuits, a first and a second of which respectively incorporate the front wheel brake actuating cylinders and the third of which incorporates the rear wheel brake actuating cylinders, and return conduits from the actuating cylinders to the reservoir, wherein said replenishing means further includes a control valve device having an inlet port communicating with said auxiliary source and an outlet port communicating with the third circuit, wherein said master cylinder device further includes an additional master piston movably received in said bore in tandem with said one master piston, said master pistons having respective end faces delimiting respective working compartments in said bore, and said housin component including an additional inlet port cooperating with said additional master piston and also communicating with said replenishment space, and two outlet ports respectively coupling one of said working compartments with the first circuit and the other working compartment with the second circuit; wherein said defining means forms two replenishment chambers each adjacent to said housing component at one of said feeding ports and forming a part of said replenishment space; wherein said interrupting means includes two interrupting valves each mounted in one of said replenishment chambers for tilting between an opening and a closing position and mechanically operatable by the respectively associated master piston for tilting into at least one of said positions thereof; further comprising at least one shutoff valve incorporated in the return conduit from the front wheel brake actuating cylinders; and wherein the return conduits from the rear wheel brake actuating cylinders bypass said shutoff valve.

17. The arrangement as defined in claim 16, wherein said establishing means includes an electromagnetically operated valve.

18. The arrangement as defined in claim 1 for use in a vehicular braking system having two separate braking circuits each of which incorporates diagonally disposed wheel brake actuating cylinders and has a return conduit from the actuating cylinders incorporated therein to the reservoir, wherein said replenishing means further includes a control valve device having an inlet port communicating with said auxiliary source and an outlet port communicating with one of the braking circuits while the master cylinder device has an outlet communicating with the other braking circuit; wherein said defining means forms a replenishment chamber adjacent to said housing component at said feeding port and forming a part of the replenishment space; wherein said interrupting means includes an interrupting valve mounted in said replenishment chamber for tilting between an opening and a closing position and mechanically operatable by said master piston for tilting into at least one of said positions thereof; and further comprising at least one shutoff valve incorporated in the return conduit of the other braking circuit which bypasses said shutoff valve.

19. The arrangement as defined in claim 18, wherein said establishing means includes an elect magnetically operated valve.

20. The arrangement as defined in claim 1 for use in a vehicular braking system having two separate braking circuits each of which incorporates diagonally disposed wheel brake actuating cylinders, wherein said replenishing means further includes a braking force booster; wherein said master cylinder device further includes an additional master piston movably received in said bore in tandem with said one master piston, said master pistons having respective end faces delimiting respective working compartments in said bore, and said housing component including an additional inlet port cooperating with said additional master piston and also communicating with said replenishment space, and two outlet ports respectively coupling one of said working compartments with one of the braking circuits and the other working compartment with the other braking circuit; wherein said defining means forms two replenishment chambers each adjacent to said housing component at one of said inlet ports and forming a part of said replenishment space; and wherein said interrupting means includes two interrupting valves each mounted in one of said replenishment chambers for tilting between an opening and a closing position and mechanicallly operatable by the respectively associated master piston for tilting into at least one of said positions thereof.

21. The arrangement as defined in claim 20, wherein said establishing means includes an electromagnetically operated valve.

22. The arrangement as defined in claim 1 for use in a hydraulic braking circuit having at least one return conduit from the actuating cylinders to the reservoir, and further comprising a valve unit including a double-piston valve member including a cutoff portion interposed in said first connecting means and switchable in dependence on the pressure of the hydraulic fluid from said auxiliary source between an open position assumed when the auxiliary source is operational and a closing position assumed when said auxiliary source fails, an interrupting portion interposed between said replishment space and said second connecting means to constitute said interrupting means, and a shutoff portion incorporated in the return conduit and movable from its open to its closed state only when said auxiliary source fails.

23. The arrangement as defined in claim 22, wherein said establishing means includes a two-port two-position valve interposed between said replenishment space and said first connecting means.

24. The arrangement as defined in claim 22 for use in a hydraulic braking circuit having three separate braking circuits, a first and a second of which incorporate the front wheel brake actuating cylinders and communicate with the one return conduit downstream of the latter and a third of which incorporates the rear wheel actuating cylinders and communicates with another return conduit downstream of the latter, wherein said master cylinder device further includes an additional master piston movably received in said bore in tandem with said one maste piston, said master pistons having respective end faces delimiting respective working compartments in said bore, and said housing component including an additional inlet port cooperating with said additional master piston and also communicating with said replenishment space, and two outlet ports respectively coupling one of said working compartments with the first circuit and the other compartment with the second circuit; wherein said replenishing means further includes a control valve device disposed between the brake operating member and said master cylinder device and having a housing part forming an extension of said housing component toward the brake operating member and bounding another bore registering with said bore, and a control valve received in said other bore and delimiting a return chamber included in the other return conduit which bypasses said valve unit.

25. The arrangement as defined in claim 1, wherein said interrupting means includes a two-port two-position valve incorporated between said replenishment space and said second connecting means and independently switchable between its open and closed positions.

* * * * *